May 10, 1960 W. J. KELLY 2,936,199
BEARINGS
Filed Sept. 12, 1956

INVENTOR
Winton J. Kelly
ATTORNEYS

United States Patent Office 2,936,199
Patented May 10, 1960

2,936,199

BEARINGS

Winton J. Kelly, Birmingham, Mich., assignor to Miniature Precision Bearings, Inc.

Application September 12, 1956, Serial No. 609,369

2 Claims. (Cl. 308—196)

This invention relates to improvements in ballbearings and more particularly to improvements in expansible ballbearings made of steel for use on shafts and with housings made of material, such as aluminum, having a different coefficient of thermal expansion. The invention includes the new expansible ballbearing and the combination thereof with the shaft and housing having a different coefficient of expansion.

In the supersonic aircraft and guided missile instrument fields, serious problems are encountered when steel ballbearings are used with shafts and housings of a metal, such as aluminum, having a different thermal rate of expansion from that of steel. Such ballbearings may be required to operate at temperatures between e.g. −67° F. and 250° F. If a steel ballbearing having a solid inner race is applied to an aluminum shaft at ordinary temperatures with a tight fit and the bearing and shaft are then cooled to −67° F., the bearing will have a loose fit on the shaft, because the aluminum shaft will contract more than the steel bearing. Also, if the inner steel race of the ballbearing is a tight fit on the aluminum shaft at a low temperature, the greater expansion of the aluminum shaft on heating to a high temperature will cause the aluminum to cold flow, because the inner race cannot expand as much as does the aluminum. And, when the aluminum shaft has thus been expanded and caused to undergo flow at high temperatures, it will contract on cooling and the inner race will have a loose fit on the shaft.

The improved ballbearing of the present invention enables such difficulties to be overcome and enables a tight fit to be maintained between the inner steel race of the ballbearing and the aluminum shaft and also between the outer steel race of the ballbearing and the surrounding aluminum housing at widely different temperatures.

According to the present invention, both the inner steel race and the outer steel race of the ballbearing are fractured at one point, and the inner race is made of a size which will tightly fit the aluminum shaft at the minimum temperature of operation, e.g. −67° F. By properly proportioning the ballbearings, the housing surrounding the outer race and the shaft on which the inner race is mounted, with respect to the thermal coefficient of expansion of the metals used in the ball bearings and in the shaft and housing, the bearings will operate satisfactorily at either the high or the low extremes of the temperature range, to which they may be subjected, and with avoidance of the usual cramping of the balls and the severe temperature loading stresses normally encountered in operation under these conditions.

Both the inner race and the outer race of the ballbearing, between which the balls are arranged, are made of steel and are machined to their final dimensions both inside and out and hardened by heat treatment. Both the outer and the inner races are broken or fractured at one location only along their periphery to provide an integral split ring which, in its normal condition, forms a full perfect circle with the two broken or fractured surfaces mating together exactly. The inner race is made to fit the shaft tightly at the minimum temperature of operation, and the outer race has a similar tight fit with the surrounding housing at the minimum temperature.

As the temperature increases, the faster expanding metal of the shaft pushes the inner race apart slightly at the fracture due to the increased circumference of the shaft and the balls between the inner and outer races expand the outer race by pressure very nearly the same amount, thus causing the outer race to expand to the original fit-up against the housing. As a result, and despite a wide temperature range, the required conditions of accuracy and tightness are maintained, and this without binding. The greater expansion of the shaft and housing, e.g. of aluminum, are compensated for by the corresponding opening up of the inner and outer races as the temperature increases and by corresponding decrease in size when the temperature falls with corresponding contraction of the shaft and housing, so that a tight fit is maintained of the inner race on the shaft and between the outer race and the housing over the entire range of temperature.

The invention will be further described in connection with the accompanying drawings illustrative of certain embodiments thereof, but it will be understood that the invention is not limited thereto.

In the accompanying drawings:

Fig. 1 is an end view or elevation of the ballbearing;

Fig. 2 is a section on the line 2—2 of Fig. 1;

Fig. 3 shows the bearing mounted on a hollow shaft and enclosed within an outer housing;

Fig. 4 is an end view or elevation of the bearing secured in place on the shaft and within the housing; and Fig. 5 is a sectional view on the line 5—5 of Fig. 4 showing a modified construction.

The inner race 1 and the outer race 2 are made of steel, machined and heat treated, and each is provided with a single fracture. The inner race 1 has a groove 3 to facilitate fracturing and has the fracture illustrated at 4. The outer ring 2 has a similar groove 5 which is fractured at 6. The method of fracturing the rings is that described in U.S. Patent 2,648,578 and the races may be assembled with the balls 7 therein, as described in said patent.

In Fig. 3, the bearing is shown mounted on a hollow shaft 8 of aluminum or other metal having a different coefficient of expansion from steel and is enclosed within an outer housing 9 of the same metal as the shaft.

The inner race is made to fit the shaft tightly at the minimum temperature. The balls and outer race are assembled with a normal internal fit-up for the specified purpose. The housing should have the normal fit-up at the minimum temperature on the outer race.

As the temperature increases, the faster expanding metal of the shaft pushes the inner race apart at the fracture due to increased circumference and the balls expand the outer race by a pressure very nearly the same amount causing the outer race to expand to the original fit-up against the housing. As a result, and despite the temperature changes, the required conditions of accuracy and tightness are maintained without binding.

As the races expand from their closed position due to expansion of the shaft, a slight opening will be formed at the fracture, so that the balls have to pass over this small open fracture in operation.

The tendency of the fractured races is to return to the normal closed position with the faces of the fracture in contact at the minimum temperature. But the expansible nature of the inner and outer races enables them to expand as the shaft and outer housing expand, thus maintaining a tight fit over a considerable temperature range, since the opening up of the inner and outer races can be in step with the expansion of the shaft in the outer housing, and, as the shaft and outer housing contract, the races will correspondingly contract to their completely closed condition at the minimum temperature. In other words, both the inner and the outer races have the capability of expanding in diameter with the expansion of the shaft and housing and have the inherent capacity of returning to the closed position at the fracture when the force which causes expansion is no longer applied. Thus, the serious problems, which are encountered due to the different expansion rate between the steel of the bearings and the light weight metals of the shaft and housing, are overcome in an advantageous manner.

Figs. 4 and 5 show a modified construction, in which the shaft 10 is of aluminum or other light metal and is provided with a groove 11, in which the inner race of the ballbearing is mounted. The outer race is held in the housing 12 by the plate 13 and bolts or screws 14 threaded in openings 15 in the housing.

In this arrangement, the groove 11 is previously machined in the shaft 10 and the inner race is made of an inner diameter to fit tightly in this groove at the minimum temperature of operation. The expansible nature of both the inner and outer rings enables these rings to be spread apart sufficiently to permit them to slide on over the shaft into the groove and then to contract normally to a tight fit in the groove on the shaft. Advantageously, also, the inner race can be first expanded and applied to the shaft and located in the groove prior to assembling the balls between the inner and outer races and before assembling the ballbearing in the outer housing.

In this arrangement, and because the inner race is in a groove, the shoulders on the sides of the race fit tightly in the groove, so that the shaft cannot shift axially under the influence of thrust loads. The inner and outer races and the balls are thus locked in position and movement is prevented of either the balls or the races in an axial direction but without interfering with the rotation of the shaft.

In the form of ballbearings shown, there is only one groove in each of the inner and outer races for a single set of balls; but it will be evident that two or more grooves and two or more sets of balls can be provided.

The improved expansible ballbearings of the present invention are advantageously used with shafts and housings of aluminum or other light metal where wide variations in temperatures are met with in operation. They can thus advantageously be used in providing ballbearings with shafts and housings of aluminum or other light material in supersonic aircraft and in the guided missile instrument fields where light weight metals are used and where a wide range of temperatures from unusually low temperatures to high temperatures may be encountered. They can advantageously be used in swivel joints for conducting liquids or gases through pipes and in variable pitch propellers.

Where the term "balls" has been used hereinbefore and is used in the appended claims, it is intended to include within its meaning all forms of rolling elements employed between the races of a bearing.

I claim:

1. A ballbearing including a shaft of light metal having a greater thermal coefficient of expansion than steel, an outer housing of light metal having substantially the same thermal coefficient of expansion as the shaft, inner and outer races of steel with balls between them, the inner race surrounding and closely fitting the shaft and the outer race being enclosed by the housing, each of said races having a single fracture lengthwise of its longitudinal axis and forming a unitary ring with a pair of abutting broken ends, said races being capable of expansion when pressure is applied to the inner race by expansion of the shaft, and said races having the inherent property of contracting when the applied pressure is reduced.

2. A ballbearing, as defined in claim 1, in which the shaft of light metal has an annular recess in which the inner race is held.

References Cited in the file of this patent
UNITED STATES PATENTS

| | | |
|---|---|---|
| 827,865 | Harris et al. | Aug. 7, 1906 |
| 2,650,864 | Mergen | Sept. 1, 1953 |
| 2,702,216 | Stearns | Feb. 15, 1955 |